United States Patent
Takahashi

(10) Patent No.: US 8,861,049 B2
(45) Date of Patent: Oct. 14, 2014

(54) IMAGE READING APPARATUS FOR READING A CONVEYED DOCUMENT AT A READING POSITION

(75) Inventor: Masafumi Takahashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 13/029,035

(22) Filed: Feb. 16, 2011

(65) Prior Publication Data

US 2011/0199655 A1    Aug. 18, 2011

(30) Foreign Application Priority Data

Feb. 17, 2010  (JP) .................................. 2010-032695

(51) Int. Cl.
H04N 1/04    (2006.01)
H04N 1/12    (2006.01)
H04N 1/193   (2006.01)

(52) U.S. Cl.
CPC ............... H04N 1/121 (2013.01); H04N 1/123 (2013.01); *H04N 2201/0081* (2013.01); H04N 1/193 (2013.01); H04N 1/1235 (2013.01)
USPC ........... 358/498; 358/474; 358/303; 358/505; 358/496

(58) Field of Classification Search
CPC ..... H04N 1/121; H04N 1/123; H04N 1/1235; H04N 1/193; H04N 2201/0081
USPC ........................... 358/498, 474, 303, 505, 496
See application file for complete search history.

(56) References Cited

U.S. PATENT DOCUMENTS

| | | | | |
|---|---|---|---|---|
| 4,440,492 A | * | 4/1984 | Howard | 355/76 |
| 4,469,319 A | * | 9/1984 | Robb et al. | 271/3.05 |
| 7,517,079 B2 | * | 4/2009 | Arai | 347/104 |
| 7,616,353 B2 | * | 11/2009 | Yamanaka et al. | 358/474 |
| 2003/0117673 A1 | | 6/2003 | Yamanaka | |
| 2004/0165227 A1 | * | 8/2004 | Makino et al. | 358/474 |
| 2004/0207887 A1 | * | 10/2004 | Makino et al. | 358/496 |
| 2010/0142007 A1 | * | 6/2010 | Seto | 358/474 |
| 2010/0225983 A1 | * | 9/2010 | Fujii et al. | 358/498 |

FOREIGN PATENT DOCUMENTS

| | | |
|---|---|---|
| JP | 2003-034450 A | 2/2003 |
| JP | 2003-189069 A | 7/2003 |
| JP | 2003-221146 A | 8/2003 |
| JP | 2004-297780 A | 10/2004 |
| JP | 2005-094060 A | 4/2005 |

* cited by examiner

Primary Examiner — Benny Q Tieu
Assistant Examiner — Quyen V Ngo
(74) Attorney, Agent, or Firm — Canon USA, Inc. IP Division

(57) ABSTRACT

A image reading apparatus includes a first conveyance unit which is configured to convey a document to a reading position of a platen while pinching the document, a second conveyance unit arranged on a downstream of the platen and configured to convey the document, an upstream rotary member arranged between the first conveyance unit and the second conveyance unit and configured to come into contact with the document at a position on an upstream of the reading position, and a downstream rotary member arranged between the first conveyance unit and the second conveyance unit and configured to come into contact with the document at a position on a downstream of the reading position, wherein a gap between the platen and the upstream rotary member is set smaller than a gap between the platen and the downstream rotary member.

7 Claims, 9 Drawing Sheets

IMAGE READING APPARATUS FOR READING A CONVEYED DOCUMENT AT A READING POSITION

BACKGROUND OF THE INVENTION

1. Field of the Invention

The present invention relates to an image reading apparatus for reading an image of a document.

2. Description of the Related Art

FIG. 9 illustrates a conventional image reading apparatus. In the conventional image reading apparatus, a document D is fed onto a platen glass 261 by a read roller pair 232, and the document is discharged from the platen glass 261 by a read discharge roller pair 233. An image of the document D is read by a reading unit 260 which is remained still at a position directly below the platen glass 261.

As illustrated in FIG. 9, the conventional image reading apparatus is equipped with a press contact releasing cam mechanism which gradually releases pressure to a read driven roller 214 of the read roller pair 232, and a control unit which controls operations of the press contact releasing cam mechanism before an upstream end portion of the document D passes the read roller pair 232. Due to this construction, the conveyance of the document D is stabilized (See Japanese Patent Application Laid-Open No. 2003-34450).

In an image reading apparatus which does not include the above described press contact releasing cam mechanism, when the document D passes through the read roller pair arranged on the upstream side of the reading unit and is released from the pinching by the read roller pair, the document may be vibrated or there may be generated a minute fluctuation in the document speed. If such vibration of the upstream end portion of the document D or a fluctuation in speed is generated, the conventional image reading apparatus tries to read the image of the document D while it is vibrating, so that it is rather difficult to obtain a read image with a satisfactory quality.

In view of this, in the conventional image reading apparatus, the pressure on the read driven roller 214 is gradually released before the document passes the read roller pair 232, so that disturbance of the read image due to the influence of the vibration generated when the document D passes through the read roller pair 232 is prevented.

The conventional image reading apparatus adopts an effective construction in which no vibration of the upstream end portion of the document is generated by releasing the pressure on the read driven roller 214 of the read roller pair 232. However, in the conventional image reading apparatus, there is provided a dedicated drive unit for releasing pressure, resulting in a rather complicated mechanism and high cost.

Japanese Patent Application Laid-Open No. 2003-189069 discusses a configuration provided with a plurality of platen rollers facing to the platen glass. However, in the configuration discussed in Japanese Patent Application Laid-Open No. 2003-189069, no measures are taken against the vibration of the document and the minute fluctuation in document speed when the document is released from the pinching by the read roller pair provided on the upstream side of the platen glass with respect to the conveyance direction.

SUMMARY OF THE INVENTION

The present invention is directed to an image reading apparatus which has a simple construction and is capable of stabilizing conveyance of a document at an image reading position.

According to an aspect of the present invention, an image reading apparatus includes a reading unit configured to read an image of a conveyed document at a reading position, a platen arranged at the reading position and situated between the conveyed document and the reading unit, a first conveyance unit which is configured to convey the document to the reading position while pinching the document and from which a trailing edge of the document is released while the image is being read, a second conveyance unit arranged on a downstream of the platen and configured to convey the document, an upstream rotary member arranged between the first conveyance unit and the second conveyance unit and configured to come into contact with the document at a position on an upstream of the reading position, and a downstream rotary member arranged between the first conveyance unit and the second conveyance unit and configured to come into contact with the document at a position on a downstream of the reading position, wherein a gap between the platen and the upstream rotary member is set smaller than a gap between the platen and the downstream rotary member.

According to the present invention, the gap between the upstream rotary member and the platen is smaller than the gap between the downstream side rotary member and the platen, so that the image reading apparatus can convey the document at the reading position in a stable manner.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following, an image reading apparatus of a first exemplary embodiment of the present invention will be described with reference to the drawings.

Figure 1:
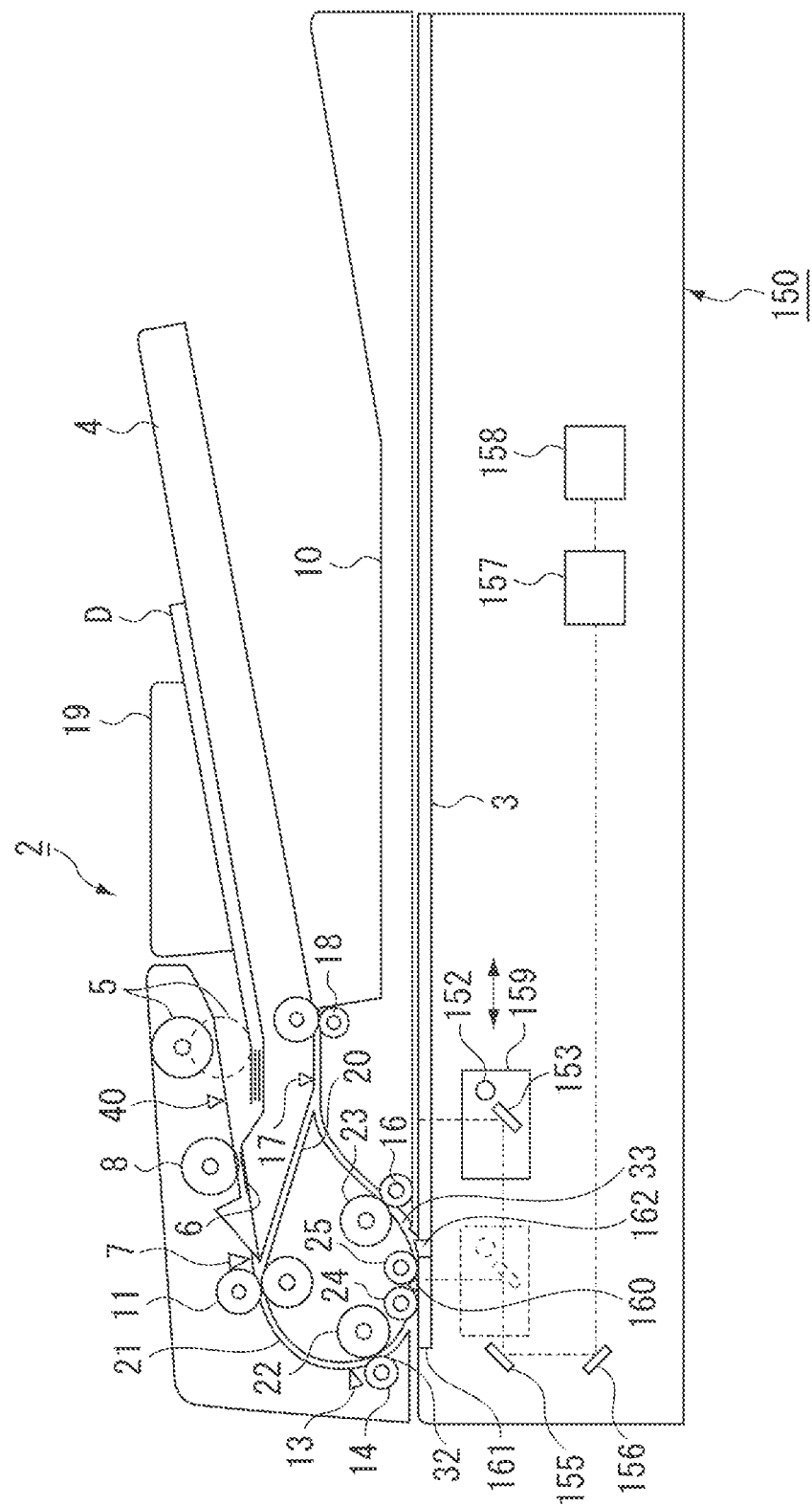
FIG. 1 is a schematic front sectional view of an image reading apparatus according to a first exemplary embodiment of the present invention.

As illustrated in FIG. 1, the image reading apparatus is equipped with a reading unit (hereinafter referred to as the "reader unit") 150 for reading an image of a document sheet (hereinafter referred to as the "document") with an image formed thereon, and an automatic document feeder unit (hereinafter referred to as the ADF) 2 for supplying the document to the reader unit 150.

[Reader Unit]

As illustrated in FIG. 1, the reader unit 150 serving as the image reading unit includes a lamp 152 for irradiating an image surface of the document D with light, mirrors 153, 155, and 156 for guiding reflection light applied by the lamp 152 and reflected by the document D to a lens 157, a charge-coupled device (CCD) 158, etc.

The lamp 152 and the mirror 153 are mounted to an optical bench 159. The optical bench 159 is connected to a motor (not illustrated) by a wire (not illustrated) and is reciprocated by rotation of the motor parallel to a document table glass 3. Using a position of a position sensor for detecting a home position of the optical bench 159 as a reference position, the motor makes normal and reverse rotation to reciprocate the optical bench 159. Thus, the optical bench 159 optically scans the document D on the document table glass 3.

The reflection light from the document D travels via the mirrors 153, 155, and 156, and is condensed on the CCD 158 by the lens 157. The CCD 158 performs photoelectric conversion on the reflection light from the document D, and outputs it as an electronic image signal to a printer unit 300.

The reader unit 150 reads the document D in one of the following modes selected by the user. One is a feeding-reading mode (ADF document reading mode) and the other is a fixed-reading mode (document table glass document reading mode). In the feeding-reading mode, the document D conveyed by an ADF 2 is read at a document reading position 160 by the optical bench 159 which is stopped at the position. In the fixed-reading mode, the document D placed on the document table glass 3 by the user is read by the optical bench 159 being moved in a sub scanning direction.

The ADF 2 is provided so as to be capable of being opened and closed with respect to the reader unit 150. Thus, in the feeding-reading mode, the user opens the ADF 2 with respect to the reader unit 150, and places the document D on the document table glass 3.

[Automatic Document Conveyance Unit (ADF)]

(Document Tray Unit)

A document tray 4 is a portion on which the document D to be read is stacked. On the document tray 4, there are arranged a pair of width direction regulation plates 19 so as to be slidable in a width direction of the document D. The width direction regulation plates 19 regulate the width direction on the document D placed on the document tray 4, so that the document D can be conveyed while set in position in the width direction.

(Document Separation Unit)

As illustrated in FIG. 1, a document supply roller 5 is arranged above the document tray 4. The document supply roller 5 rotates in synchronization with rotation of a separation conveyance roller 8, and conveys the document D into the ADF. Normally, the document supply roller 5 stands by at an above position, namely a home position (the position indicated by the solid line in the diagram), so as not to obstruct the document D when the document D is stacked on the document tray 4. At the start of the conveyance of the document D, the document supply roller 5 descends from the position indicated by the solid line to the position indicated by the dashed line to abut on the upper surface of the document D.

The document supply roller 5 is rotatably supported by an arm (not illustrated), and is ascended and descended with rocking of the arm.

A separation pad 6 is arranged facing to the separation conveyance roller 8, and is supported in press contact with the separation conveyance roller 8. The separation pad 6 is formed of a frictional material such as rubber whose friction coefficient is somewhat smaller than that of the separation conveyance roller 8. Together with the separation conveyance roller 8, the separation pad 6 separates one document D at one time from the documents D supplied by the document supply roller 5.

(Document Conveyance Unit)

A registration roller pair 11 is provided for the purpose of correcting an orientation of the document D straight (which operation will be hereinafter referred to as the registration operation) when the document D is obliquely sent by the separation conveyance roller 8. The registration operation by the registration roller pair 11 will be described. When the document D arrives, a nipping portion of the registration roller pair 11 receives a downstream end portion of the document D while at rest. The document D is continued to be conveyed by the separation conveyance roller 8, so that, when the downstream end portion thereof is pressed against the nipping portion, its intermediate portion is turned into a loop-like shape. Accordingly, the obliquely oriented document D can be corrected straight.

A read roller pair 32 serving as a first conveyance unit includes a read roller 22 and a read driven roller 14, and is adapted to convey the document D toward a platen glass 161 serving as the platen. Further, a read discharge roller pair 33 serving as a second conveyance unit includes a read discharge roller 23 and a read discharge driven roller 16, and is adapted to convey the document D from the platen glass 161 to a document discharge roller pair 18.

As illustrated in FIG. 2, between the platen glass 161 and the read discharge driven roller 16, there is arranged a jump stand 162 adapted to guide the document D so as to scoop it up from the platen glass 161. When the document D passes over the platen glass 161, on which the document reading position 160 exists, the document D is read by the reader unit 150. The document discharge roller pair 18 is arranged so as to discharge onto a document discharge tray 10 the document D read at the document reading position 160.

As illustrated in FIG. 1, between the separation conveyance roller 8 and the document discharge roller pair 18, there is provided a guide path 21 curved into a U-shape and serving to guide the document D. An upstream platen roller 24 serving as an upstream rotary member and a downstream platen roller 25 serving as a downstream rotary member, which constitute a feature of the present invention, are arranged on an inner side of the curved guide path 21, and are adapted to be brought into contact with a surface of the conveyed document D on the side opposite to the platen glass 161 while rotating.

In the present exemplary embodiment, a material of the platen glass 161 is glass, however, it is also possible to employ some other transparent glass-like material (e.g., plastic).

(Configuration of the Platen Glass and the Periphery Thereof)

Figure 3:
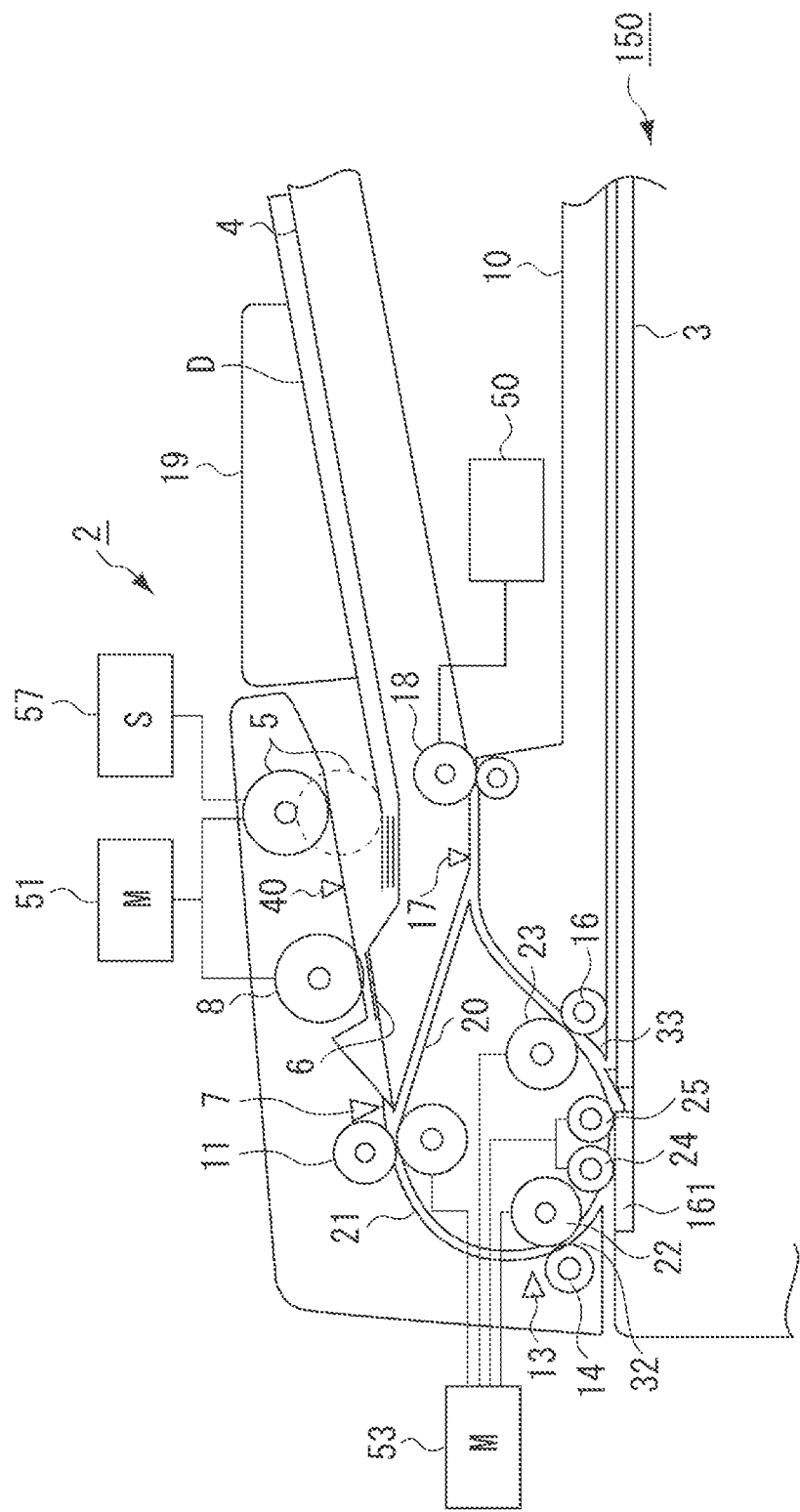
FIG. 3 is a schematic front sectional view illustrating a drive system of the image reading apparatus.

As illustrated in FIG. 1, the upstream platen roller 24 and the downstream platen roller 25 are arranged at positions facing the platen glass 161 for feeding reading. Further, as illustrated in FIG. 3, the upstream platen roller 24 and the downstream platen roller 25 are driven by a read motor 53. Rubber rollers whose surfaces are white are used as the upstream platen roller 24 and the downstream platen roller 25.

By using the white rubber rollers as the upstream platen roller 24 and the downstream platen roller 25, when the reader unit 150 reads the document D, the roller itself can be prevented from being read even if the document D is so thin as to be seen through. The rubber rollers may be some other color than white so long as it helps to prevent the roller itself from being read. The upstream platen roller 24 and the downstream platen roller 25 may also be belts that are driven to rotate.

Figure 2A:
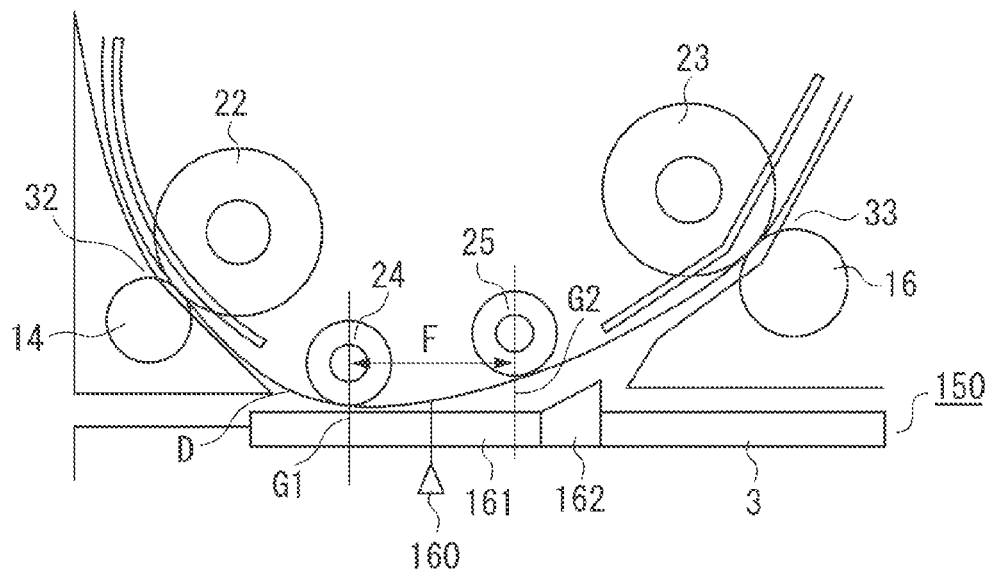
FIGS. 2A and 2B are schematic front sectional views for illustrating an operation of the image reading apparatus.

As illustrated in FIG. 2A, the upstream platen roller 24 and the downstream platen roller 25 are respectively arranged with gaps G1 and G2 provided with respect to the platen glass 161. The gaps G1 and G2 are gaps allowing passage of the document D, and in the present exemplary embodiment, their dimension ranges from approximately 0.15 mm to 1.0 mm. The gap G1 corresponds to a distance between an outer peripheral surface of the upstream platen roller 24 and the platen glass 161. The gap G2 corresponds to a distance between an outer peripheral surface of the downstream platen roller 25 and the platen glass 161.

The upstream platen roller 24 and the downstream platen roller 25 are arranged such that the gap G1 between the upstream platen roller 24 and the platen glass 161 is smaller than the gap G2 between the downstream platen roller 25 and the platen glass 161.

According to the arrangement of the upstream platen roller 24, the upper surface of the document D on the platen glass 161 is pressed by the upstream platen roller 24, so that the distance from the platen glass 161 can be regulated. Further, according to the arrangement of two platen rollers directly above and on the downstream side of the reading position, a conveyance locus of the document sheet involves substantially no uplift of the document D in a region in the vicinity of the intermediate position between the upstream platen roller 24 and the downstream platen roller 25 due to rigidity and stiffness of the document sheet.

More specifically, the setting of the reading position from the intermediate position between the upstream platen roller 24 and the downstream platen roller 25 to a position directly below the upstream platen roller 24, no uplift of the document D is generated, so that an image on the document can be read without involving any focus blur or fogging of the image. The term fogging means an image defect caused when the document D is read darker than its actual color due to low luminance as a result of a change in a positional relationship between the illumination light and the document D caused by uplift of the document D.

(Drive System)

FIG. 3 illustrates a drive system which includes a motor for driving the rollers, solenoids and the like. When a separation solenoid 57 is turned on, the separation solenoid 57 raises the document supply roller 5 to the upper position, which is the home position (indicated by the solid line in the drawing), and retains it there. When it is turned off, the separation solenoid 57 causes the document supply roller 5 to fall on the document D placed on the document tray 4. The separation solenoid 57 is provided to retain the document supply roller 5 at a position where it does not obstruct the document D when the document D is set on the document tray 4.

As a separation motor 51, a read motor 53, and a document discharge motor 50, stepping motors are used. The separation motor 51 rotates the separation conveyance roller 8 and the document supply roller 5 in the conveyance direction. The read motor 53 rotates the registration roller pair, the read roller 22, the upstream platen roller 24, the downstream platen roller 25, and the read discharge roller 23. The document discharge motor 50 rotates the document discharge roller pair 18.

(Sensor)

As illustrate in FIG. 3, above the document tray 4, there is provided a document setting detection sensor 40 which is a transmission type optical sensor for detecting placing of the document D on the document tray 4. Further, below the document tray 4, there is provided a document width detection sensor 44 (see FIG. 5) which detects positions of the width direction regulation plates 19 to detect the width dimension of a document bundle P placed on the document tray 4. Between the separation conveyance roller 8 and the registration roller pair 11, there is provided a registration sensor 7 which is a transmission type optical sensor for detecting the document D. The registration sensor 7 is used to detect the leading edge of the document D that is separated and fed and to measure a timing with which an abutment amount (loop amount) with respect to the registration roller pair 11 is controlled.

On the upstream side of the read driven roller 14, there is provided a read sensor (position detection sensor) 13 which is a reflection type optical sensor for detecting the document D. The read sensor 13 is provided to detect the leading edge (the downstream end portion) of the document D and to measure a timing for issuing a reference signal for starting the image reading by the reader unit 150. On the upstream side of the document discharge roller pair 18, there is provided a document discharge sensor 17 which is a transmission type optical sensor for detecting the document D. The document discharge sensor 17 is used to measure a timing with which the document is discharged.

(Control Circuit)

Figure 5:
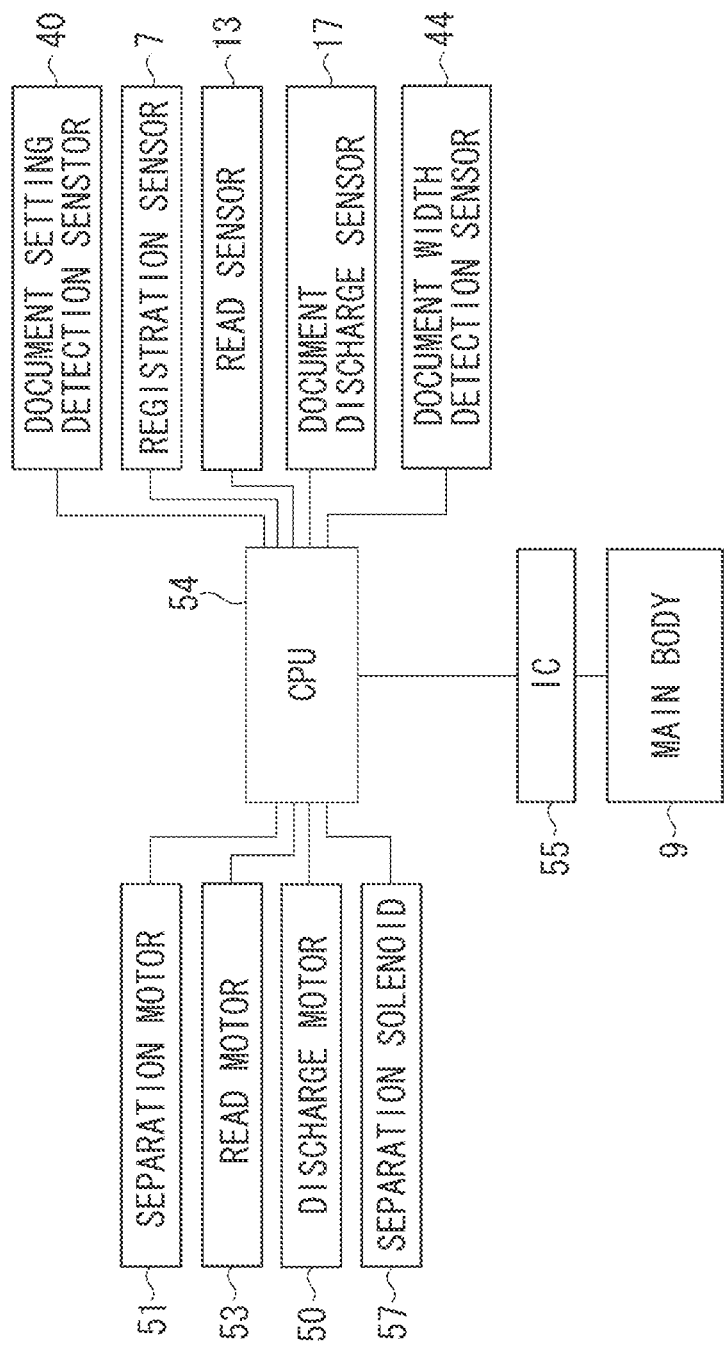
FIG. 5 is a control block diagram for the image reading apparatus.

FIG. 5 is a block diagram illustrating a control circuit of the ADF. The control circuit is formed using a microprocessor 54 (hereinafter referred to as the central processing unit (CPU) 54) as the main component. Drive circuits and sensors of various loads are connected to input and output ports of the CPU 54. Further, the control circuit is equipped with a random-access memory (RAM) which is backed up by a battery (not illustrated), and a read-only memory (ROM) in which control sequence software is stored.

The separation motor 51, the read motor 53, and the document discharge motor 50 are respectively driven by stepping motor drivers. A mutual excitation signal and a motor current control signal are input to each driver from the CPU 54. The separation solenoid 57 is driven by the driver, and is connected to the input and output ports of the CPU 54 to be controlled in operation based on a signal from the CPU 54.

The various sensors, such as the registration sensor 7, the document setting detection sensor 40, the read sensor 13, the document discharge sensor 17, and the document width detection sensor 44, are connected to the input ports of the CPU 54, and are adapted to input detection signals to the CPU.

(Operation of the ADF)

The document setting detection sensor 40 detects whether the document D is on the document tray 4 or not. When the document D is on the document tray, the document width detection sensor 44 on the document tray 4 detects a document size. The separation solenoid 57 lowers the document supply roller 5.

When the operation of the ADF 2 is started, the document supply roller 5 is brought into contact with the uppermost document, and sends the document to the gap between the separation conveyance roller 8 and the separation pad 6.

When a plurality of documents D are supplied from the document tray 4 with stacking one upon the other, the separation conveyance roller 8 and the separation pad 6 separate the documents D from each other and convey them one by one to the registration roller pair 11. When the document D is being skew-fed, the registration roller pair 11 corrects the document D straight, and conveys it to the nipping portion of the read roller pair 32 (the nipping portion of the read roller 22 and the read driven roller 14).

The read roller 22 and the read driven roller 14 pass the document D through the gap G1 between the platen glass 161 and the upstream platen roller 24 and through the gap G2 between the platen glass 161 and the downstream platen roller 25 to convey the document D to the nipping portion of the read discharge roller 23 and the read discharge driven roller 16. Further, the upstream platen roller 24 and the downstream platen roller 25 are driven by the read motor 53, and, by winding the document D passing through the gaps G1 and G2 around the upstream platen roller 24 and the downstream platen roller 25, conveyance force is applied to the document D.

When the document D reaches the discharge roller 23, the read roller pair 32, the upstream platen roller 24, the downstream platen roller 25, and the read discharge roller pair 33 convey the document D by the rotational force of the read motor 53.

By the optical bench 159 at rest to irradiate the document with light at the reading position 160, the reader unit 150 irradiates with light the document D passing through the gaps G1 and G2 between the platen glass 161 and the upstream platen roller 24 and the downstream platen roller 25. The reader unit 150 causes the reflection light from the document D to enter the CCD 158 to read the image of the document D.

Referring to FIG. 2A, how the document D is conveyed while pinched by the read roller pair 32 and the read discharge roller pair 33 is described. In order that the document D may not be bent during its conveyance, a peripheral velocity (V2) of the read discharge roller pair 33 which is on the downstream side is set higher than a peripheral velocity (V1) of the read roller pair 32 which is on the upstream side. Further, above the platen glass 161, the upstream platen roller 24 and the downstream platen roller 25, which are rocked independently of each other, are arranged with constant pressing force in the direction of the platen glass 161 applied thereto. Thus, a curved portion of the document D in the vicinity of the document reading position 160 is supported by being brought into contact with the upstream platen roller 24 and the downstream platen roller 25 with respect to tension generated in the document D.

The upstream platen roller 24 and the downstream platen roller 25 thus arranged above the platen glass 161 to rotate convey the document D by the frictional force obtained by the force with which the rollers are pressed against the document D. It is supposed that a peripheral velocity of the upstream platen roller 24 and the downstream platen roller 25 is defined V3. The velocities V1, V2, and V3 are set in the following relationship: $V1 \leq V3 \leq V2$. More specifically, in order that the document D may not be bent during its conveyance, the velocity V3 is set not higher than the velocity V2 but not lower than the velocity V1.

The document reading position 160 is set so as to allow the reading of the image of the document D conveyed in a section (a section F in FIG. 2A) between the position where the upstream platen roller 24 is closest to the platen glass 161 and the position where the downstream platen roller 25 is closest to the platen glass 161.

Further, by adjusting the gap G2 such that the gap G2 directly below the downstream platen roller 25 satisfies a requisite depth of the reading system, the document reading position 160 can be set at any position between the upstream platen roller 24 and the downstream platen roller 25. When any dirt on the platen glass 161 is detected based on the image read by the reader unit 150, the optical bench 159 may be moved so as to change the document reading position 160 to a position which is between the upstream platen roller 24 and the downstream platen roller 25 and which is away from the dirt.

It has been confirmed through experiment that an arrangement in which the gap G1 is smaller than the gap G2 can reduce the disturbance of the read image due to the influence of vibration when the document D passes through the read roller pair 32. It can be assumed that reduction of the disturbance of the read image is due to the fact that the upstream platen roller 24 functions so as to further prevent the vibration generated when the document D passes the read roller pair 32 from being propagated via the document to the reading position 160 side.

Figure 2B:
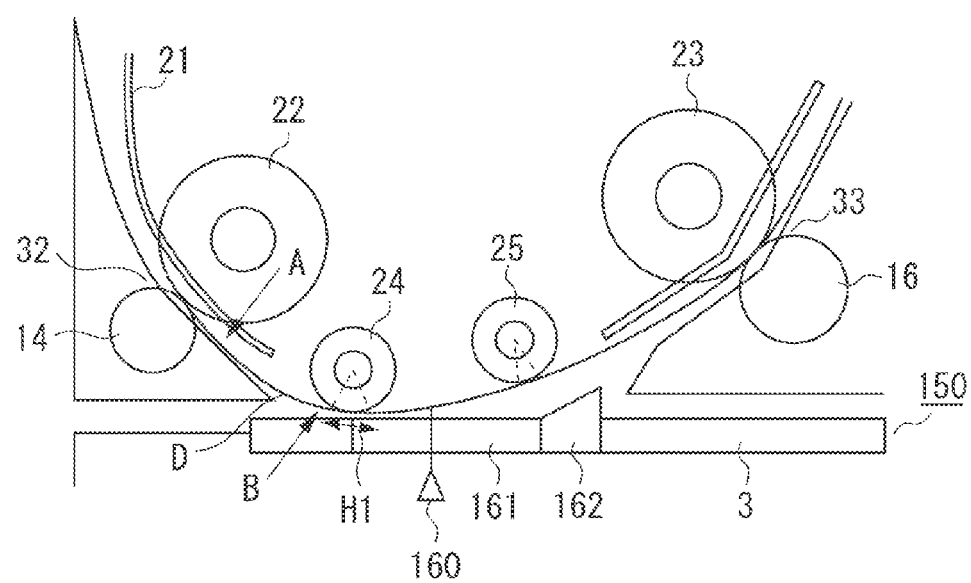

As illustrated in FIG. 2B, according to the arrangement in which the gap G1 is smaller than the gap G2, a winding angle H1 of the document D with respect to the upstream platen roller 24 can be made larger than that of when the gap G1 is equal to the gap G2. The nipping portion of the read roller pair 32 is situated at a position more spaced apart from the platen glass 161 than the portion where the upstream platen roller 24 comes into contact with the document D.

The nipping portion of the read discharge roller pair 33 is situated at a position more spaced apart from the platen glass 161 than the portion where the downstream platen roller 25 comes into contact with the document D. According to this configuration, the winding angle H1 of the document D can be increased with respect to the upstream platen roller 24. By increasing the winding angle of the document D with respect to the upstream platen roller 24, it is possible to bring about a situation in which the conveyance force of the upstream platen roller 24 can be easily applied to the document D.

In this way, by winding the document D around the upstream platen roller 24 arranged above the platen glass 161, the vibration generated when the upstream end portion (trailing edge) with respect to the conveyance direction of the document D passes through the read roller pair 32 can be suppressed by the upstream roller 24. Thus, by winding the document D around the upstream platen roller 24, it can make the vibration difficult to be propagated to the portion of the document D on the downstream side of the upstream platen roller 24. As a result, the upstream platen roller 24 can suppress the disturbance in the read image due to the influence of the vibration generated when the document D passes through the read roller pair 32.

At the moment that the document D passes through the read roller pair 32, the read roller pair 32 pushes in the trailing edge of the document D to generate a fluctuation in speed at the trailing edge side of the document D, making it rather difficult to stabilize the speed of the document D. In the present exemplary embodiment, if a minute fluctuation in speed is generated at the trailing edge side of the document D, since an amount that the document D is wound around the upstream platen roller 24 is large, the document D is constrained by the upstream platen roller 24, making it possible to convey the document in a more stable manner. More specifically, the upstream platen roller 24 can prevent the vibration of the document D due to a fluctuation in speed at the trailing edge side of the document D generated when the document D passes through the read roller pair 32 from being propagated to the downstream side of the upstream platen roller 24, so that a satisfactory read image can be obtained.

Further, the upstream platen roller 24 and the downstream platen roller 25 are supported by rocking units which rock independently of each other. In other words, the upstream platen roller 24 is rotatably supported by an upstream rotation arm 26. The downstream platen roller 25 is rotatably supported by a downstream rotation arm 27.

Figure 4A:
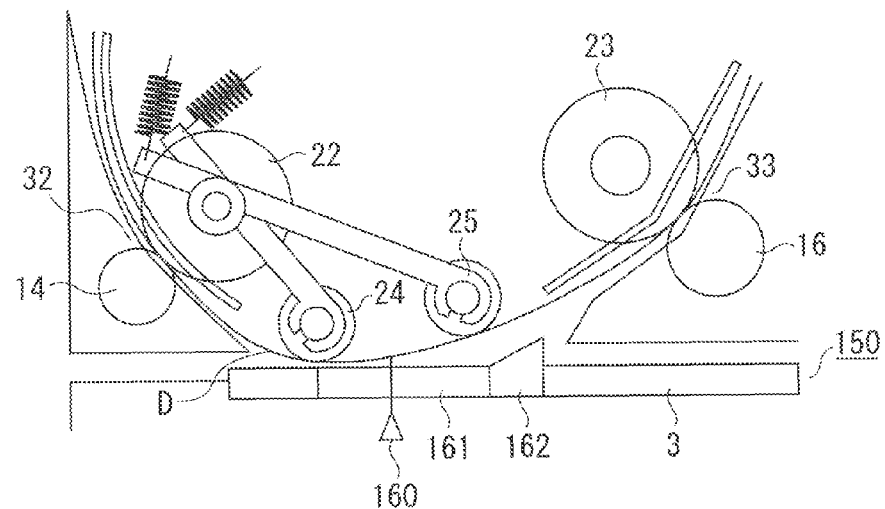
FIGS. 4A and 4B are schematic front sectional views for illustrating a rocking unit of the image reading apparatus.

As illustrated in FIG. 4A, in the present exemplary embodiment, the upstream rotation arm 26 and the downstream rotation arm 27 are arranged so as to rotate around a shaft of the read roller 22. Thus, the upstream platen roller 24, which is provided at the end portion side of the upstream rotation arm 26 that is supported so as to be rotatable around the shaft of the read roller 22, can rock. Further, the downstream platen roller 25, which is provided at the end portion side of the upstream rotation arm 27 that is supported so as to be rotatable around the shaft of the read roller 22, can rock.

Figure 4B:
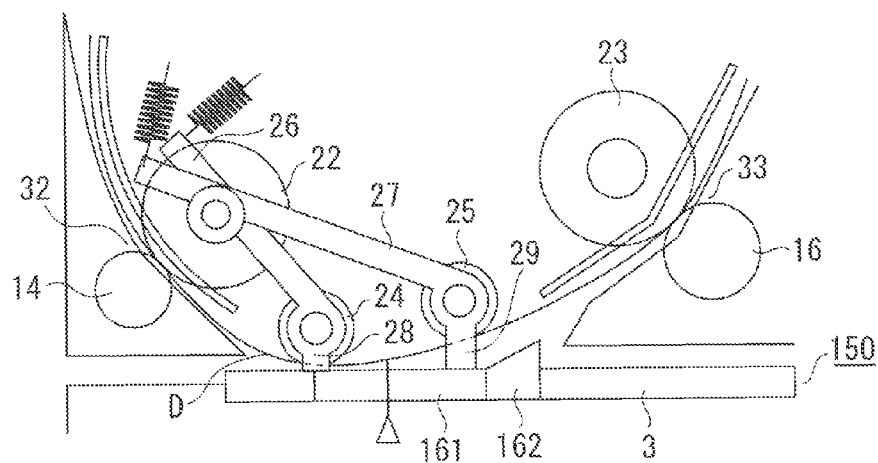

As illustrated in FIG. 4B, the upstream rotation arm 26 includes an upstream abutment portion 28. The upstream abutment portion 28 serves as a positioning portion and abuts on the platen glass 161 so that the upstream platen roller 24 may be at a predetermined distance from the platen glass 161. As illustrated in FIG. 4B, the downstream rotation arm 27 includes a downstream abutment portion 29. The downstream abutment portion 29 serves as a positioning portion and abuts on the platen glass 161 so that the upstream platen roller 25 may be at a predetermined distance from the platen glass 161.

Both the upstream rotation arm 26 and the downstream rotation arm 27 are pressed against the platen glass 161 by an elastic member such as a spring, and placed at predetermined positions. As a result, the gaps G1 and G2 are respectively maintained for the upstream platen roller 24 and the downstream platen roller 25 with respect to the platen glass 161.

According to the above configuration, the upstream platen roller 24 and the downstream platen roller 25 can reduce a minute vibration generated during the conveyance of the document D by coming into contact with the document D, so that the conveyance of the document D at the document reading position 160 can be stabilized.

In the present exemplary embodiment, both the upstream rotation arm 26 and the downstream rotation arm 27 rotate around the shaft of the read roller 22, however, it is also possible to provide another shaft around which they are to be rotated.

Further, the gaps G1 and G2 can be made larger than the thickness of the document to be conveyed for the upstream platen roller 24 and the downstream platen roller 25 not to pinch the document D. In this case, no particular vibration is generated when the document D leaves the upstream platen roller 24.

The situation directly after the upstream end portion (trailing edge) with respect to the document conveyance direction of the document D passes through the read roller pair 32 will be described with reference to FIG. 2B. The upstream end portion of the document D is shifted from a condition in which it is curved along the U-shaped guide path 21 to be straight by the restoring force and own weight of the document itself, as a result, the force in the direction indicated by an arrow A is exerted thereon. Accordingly, the upstream end portion of the document is conveyed along the outer periphery of the read driven roller 14, and is further conveyed along the outer side of the guide path 21.

In addition, at the position where the document is in contact with the upstream platen roller 24, the restoring force of the document D is exerted so as to press the document itself against upstream platen roller (in the direction indicated by an arrow B). In other words, even in a situation in which the document D is not pinched by the read roller pair 32, the upstream platen roller 24 can easily apply the conveyance force to the document D, so that the document D can be conveyed in a stable manner.

When the reading of the document D by the reader unit 150 has been completed, the ADF 2 discharges the document D onto the document discharge tray 10 using the document discharge roller pair 16 and stacks it thereon. Accordingly, the operation of reading one side of the document D is completed.

A case in which images formed on both sides of the document D are read by the reader unit 150 will be described. When the reader unit 150 has read the image on one side, the ADF 2 does not discharge the document D onto the document discharge tray 10 using the document discharge roller pair 18, and performs switch-back conveyance to send the document D into a switch back path 20. After this, when the document D is being skew-fed, the registration roller pair 11 corrects the document D straight. From this onward, the ADF 2 conveys the document D in the same manner as described above.

According to the above description, the document reading position 160 can be set at any position between the upstream platen roller 24 and the downstream platen roller 25. However, it has been clarified through experiment that it is more desirable to set the document reading position 160 as described below.

More particularly, the document reading position 160 is set at a position which is between the position directly below the upstream platen roller 24 and the position directly below the downstream platen roller 25 and which is on the upstream side of the intermediate position between the position directly below the upstream platen roller 24 and the position directly below the downstream platen roller 25 (on the side of the position directly below the upstream platen roller 24). It may be because that, according to the above setting, the upstream platen roller 24, whose gap G1 from the platen glass 161 set smaller, can further prevent uplift of the document from the platen glass 161, and that the conveyance of the document is more stable where the upstream platen roller 24 is near since the document is wound around the upstream platen roller 24 by a large amount.

As described above, by winding the document D around the upstream platen roller 24 arranged above the platen glass 161, the upstream platen roller 24 can suppress the vibration generated when the upstream end portion (trailing edge) with respect to the conveyance direction of the document D passes through the read roller pair 32. Thus, by winding the document D around the upstream platen roller 24, it can make the vibration difficult to be propagated to the portion of the document D on the downstream side of the upstream platen roller 24. As a result, the upstream platen roller 24 can suppress the disturbance in the read image due to the influence of the vibration generated when the document D passes through the read roller pair 32.

In the following, an image reading apparatus according to a second exemplary embodiment of the present invention will be described with reference to FIGS. 6 through 8. The second exemplary embodiment differs from the first exemplary embodiment in that there is provided a circular arc guide between the upstream platen roller 24 and the downstream platen roller 25. In the following, the difference from the first exemplary embodiment will be described in detail. The components that are similar to those of the first exemplary embodiment are indicated by the same reference numerals, and a detailed description thereof will be omitted.

Figure 6:
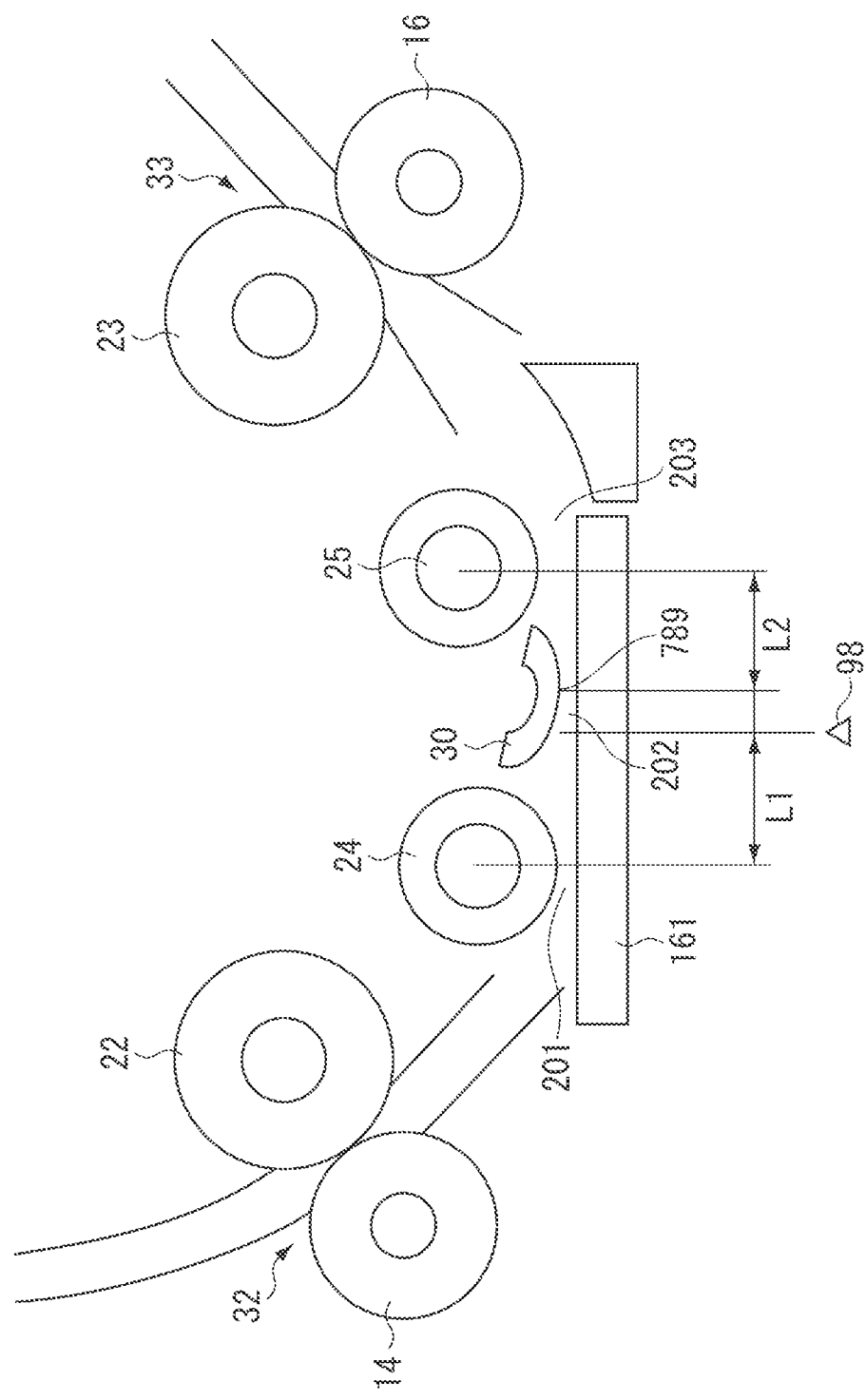
FIG. 6 illustrates a configuration of an image reading apparatus according to a second exemplary embodiment of the present invention.

FIG. 6 is a sectional view of the platen glass 161 and the components around the same of the image reading apparatus according to the second exemplary embodiment of the present invention. As illustrated in FIG. 6, the upstream platen roller 24 and the downstream platen roller 25 are arranged between the read roller pair 32 and the read discharge roller pair 33, and at a position facing to the feeding-reading platen glass 161. As in the first exemplary embodiment, the upstream platen roller 24 and the downstream platen roller 25 are rotated by the read motor 53.

The upstream platen roller 24 and the downstream platen roller 25 are arranged so as to be spaced apart from the platen glass 161 by gaps 201 and 203, respectively. The gaps 201 and 203 are gaps allowing passage of the document, and their dimension ranges from approximately 0.3 mm to 1.0 mm. The gap 201 corresponds to a distance between the lowermost point of the outer peripheral surface of the upstream platen roller 24 and the platen glass 161. The gap 203 corresponds to a distance between the lowermost point of the outer peripheral surface of the downstream platen roller 25 and the platen glass 161. Depending upon the apparatus configuration, a transparent sheet may be attached to the upper surface of the platen glass 161. In this case, the gaps between the platen and the platen rollers are the gaps between the lowermost points of the outer peripheral surfaces of the platen rollers and the transparent sheet.

As in the first exemplary embodiment, the upstream platen roller 24 and the downstream platen roller 25 are arranged such that the gap 201 between the upstream platen roller 24 and the platen glass 161 is smaller than the gap 203 between the downstream platen roller 25 and the platen glass 161.

As illustrated in FIG. 6, between the upstream platen roller 24 and the downstream platen roller 25, there is arranged a circular arc guide 30 of a circular arc sectional configuration. The circular arc guide 30 is provided at a position corresponding to a reading position 98 of the platen glass 161. The circular arc guide 30 is arranged such that a gap 202 is secured between the portion of the circular arc guide 30 closest to the platen glass 161 (hereinafter referred to as a proximity portion 789 of the circular arc guide 30) and the platen glass 161.

The gap 202 is a gap allowing passage of the document, and it is desirable for the gap to be set to approximately 0.15 mm to 0.5 mm. The gaps 201, 202, and 203 respectively between the platen glass 161 and the upstream platen roller 24, the circular arc guide 30, and the downstream platen roller 25 are arranged such that the following relationship can be satisfied, the gap 202<the gap 201, and the gap 202<the gap 203.

By arranging the circular arc guide 30 directly above the document reading position 98, uplift of the document can be regulated by the proximity portion 789 of the circular arc guide 30. In this way, the proximity portion of the circular arc guide 30 can regulate a vertical movement of the document at the reading position 98. Thus, in the second exemplary embodiment, for example, the gap between the upstream platen roller 24 and the platen glass 161 can be set larger as compared with the first exemplary embodiment, so that it is possible to reduce torque for driving the upstream platen roller 24 for conveyance.

The circular arc guide 30 has abutment portions which abut on the platen glass 161 at both end portions in the width direction of the document and outside a document passage area so as to be at a predetermined distance with respect to the platen glass 161. The circular arc guide 30 is mounted in a rockable state, and its abutment portions abut on the platen glass 161 while urged toward the platen glass 161 by a spring 399, which is an elastic member, so that the circular arc guide 30 can be placed at a predetermined position.

The present exemplary embodiment is the same as the first exemplary embodiment in that the two platen rollers 24 and 25 are supported by a rocking arm. The rocking arm which supports the two platen rollers 24 and 25 in a rockable state can be provided with a circular arc guide of a circular arc sectional configuration extending in the width direction.

The document conveyance operation of the present exemplary embodiment will be described below, centering on the difference from the first exemplary embodiment.

The document D which is conveyed while nipped by the read roller 22 and the read driven roller 14 is passed through the gap 201 between the platen glass 161 and the upstream platen roller 24, the gap 202 between the platen glass and the circular arc guide, and the gap 203 between the platen glass and the downstream platen roller 25, and is sent to the nipping portion between a read discharge roller 23 and a read discharge driven roller 16.

The upstream platen roller 24 and the downstream platen roller 25 are driven as described above. The document passing through the gaps 201 and 203 are wound around the outer peripheries of the upstream platen roller 24 and the downstream platen roller 25, so that the upstream platen roller 24 and the downstream platen roller 25 apply the conveyance force to the document. The upstream platen roller 24 and the downstream platen roller 25, which are driven to rotate, do not pinch the document, and serve to cause the document to follow the rotation speed of the platen rollers by the frictional force and the force with which they are pressed against the document.

The larger the distance in the conveyance direction between the upstream platen roller 24 and the downstream platen roller 25 becomes, the smaller the distance in the conveyance direction between the upstream platen roller 24 and the read roller pair 32 or between the downstream platen roller 25 and the read discharge roller pair 33 becomes, so that a document winding angle increases. Increase in the document winding angle can increase the conveyance force of the two platen rollers. When the document conveyance force of the platen rollers increases, the effect of causing the document to follow the platen rollers is enhanced, and the propagation to the reading position of the shock applied to the document on the upstream side of the upstream platen roller 24 can be reduced, so that the image can be read in a satisfactory manner.

Further, as in the first exemplary embodiment described above, it has been clarified through experiment that the quality of the read image can be improved by an arrangement in which the gap 201 between the upstream platen roller 24 and the platen glass 161 is set smaller than the gap 203 between the downstream platen roller 25 and the platen glass 161. By making the gap 201 between the upstream platen roller 24 and the platen glass 161 smaller than the gap 203 between the downstream platen roller 25 and the platen glass 161, the document winding angle with respect to the upstream platen roller 24 increases. It can be assumed that, as a result of the increase in the document winding angle with respect to the upstream platen roller 24, the effect of causing the document to follow the peripheral velocity of the platen roller 24 is enhanced, and the quality of the read image can be improved.

The proximity portion 789 of the circular arc guide 30 is arranged on the downstream side of the intermediate position between the upstream platen roller 24 and the downstream platen roller 25. More specifically, as illustrated in FIG. 6, a distance L1 from the upstream platen roller 24 to the proximity portion of the circular arc guide 30 as measured along the upper surface of the platen glass 161 is larger than a distance L2 from the proximity portion of the circular arc guide 30 to the downstream platen roller 25.

By arranging the proximity portion 789 of the circular arc guide 30 on the downstream side of the intermediate position between the upstream platen roller 24 and the downstream platen roller 25, it is possible to set the document conveyance route without reducing the winding angle with respect to the upstream platen roller 24. At the reading position 98, a curved portion is formed in the document D by being supported by the upstream platen roller 24, the downstream platen roller 25, and the platen glass 161. The proximity portion 789 of the circular arc guide 30 is arranged at a position where the curved portion of the document formed is supported from the inner side.

The reading position 98 is set on the upstream side with respect to the proximity portion 789 of the circular arc guide 30. By arranging the proximity portion 789 of the circular arc guide 30 on the downstream side of the intermediate position between the two platen rollers 24 and 25, it is possible to secure a region that can be more widely utilized as the reading position 98.

By maintaining a document conveyance attitude (document configuration) at the three points of the circular arc guide 30, the upstream platen roller 24, and the downstream platen roller 25, the document conveyance attitude can be maintained constant. Since the circular arc guide 30 has the circular arc shape, by reducing the contact area, in which the circular arc guide 30 and the document are held in contact with each other, in the conveyance direction, a scrape on the side opposite to the document image reading side and adhesion of dirt to the guide can be suppressed to a minimum.

Due to rigidity or stiffness of the document, even in the region from the position directly below the upstream platen roller 24 to the proximity portion 789 of the circular arc guide 30, document uplift from the platen glass 161 is hard to be generated. As described above, in the present exemplary embodiment, the reading position 98 is set between the position directly below the upstream platen roller 24 and the proximity portion 789 of the circular arc guide 30.

Thus, the reader unit 150 reads the portion of the document which does not easily undergo uplift from the platen glass 161, so that the image can be read without involving any image defects as focus blur and fogging. The term fogging means an image defect caused when the document is read darker than it actual color due to low luminance as a result of a change in the positional relationship between the illumination light and the document caused by uplift of the document.

It will be described how the document is conveyed while pinched by both the read roller pair 32 and the read discharge roller pair 33. In order to prevent the document from being bent during its conveyance, a peripheral velocity of a roller is set higher as the roller is arranged more downstream. Regarding the conveyance force, the conveyance force is set smaller as the roller is arranged more downstream. Accordingly, tensile force with respect to the document is generated between the read roller pair 32 and the read discharge roller pair 33. Due to the tensile force, tension is generated in the document. The actual document conveyance speed is controlled by the peripheral velocity of the read roller pair 32.

Figure 7:
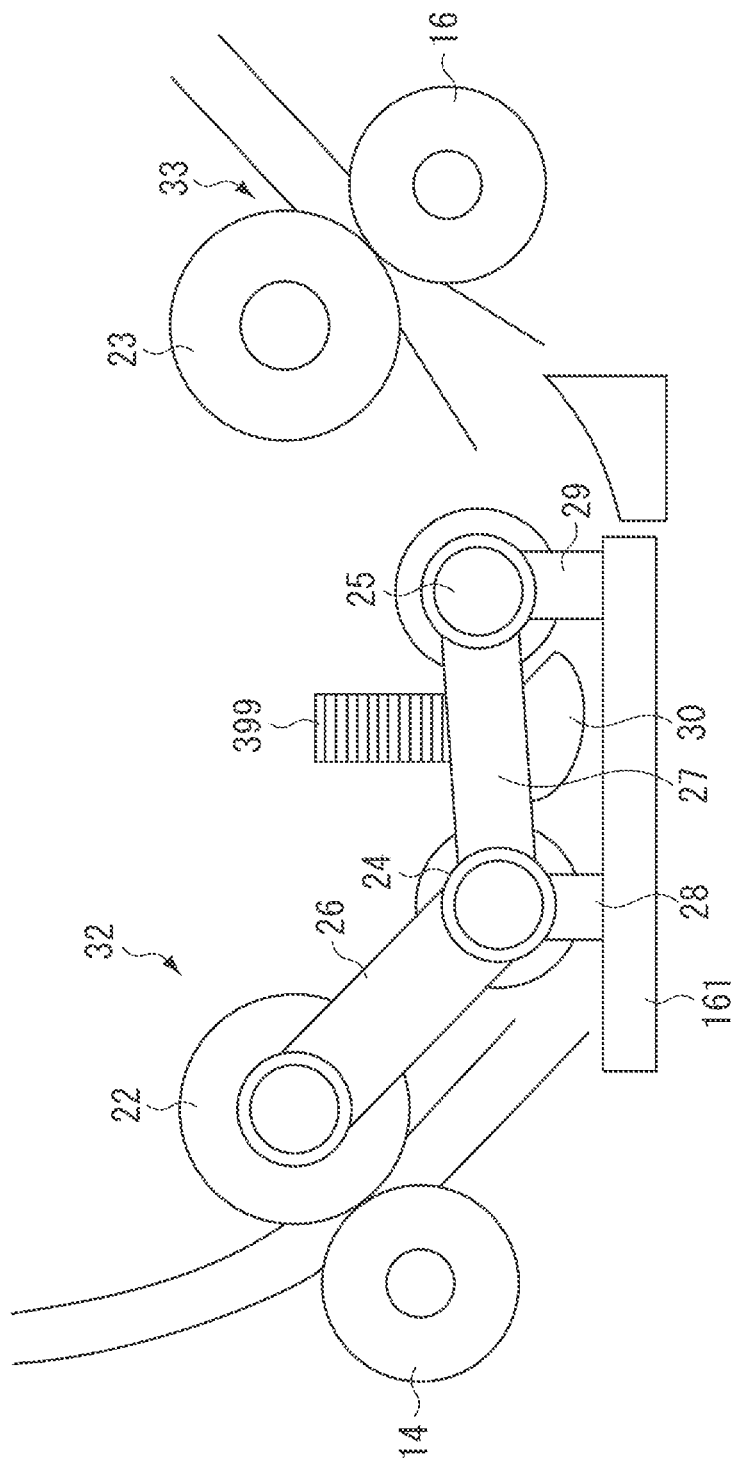
FIG. 7 is a front sectional view of the image reading apparatus in FIG. 6.
Figure 8:
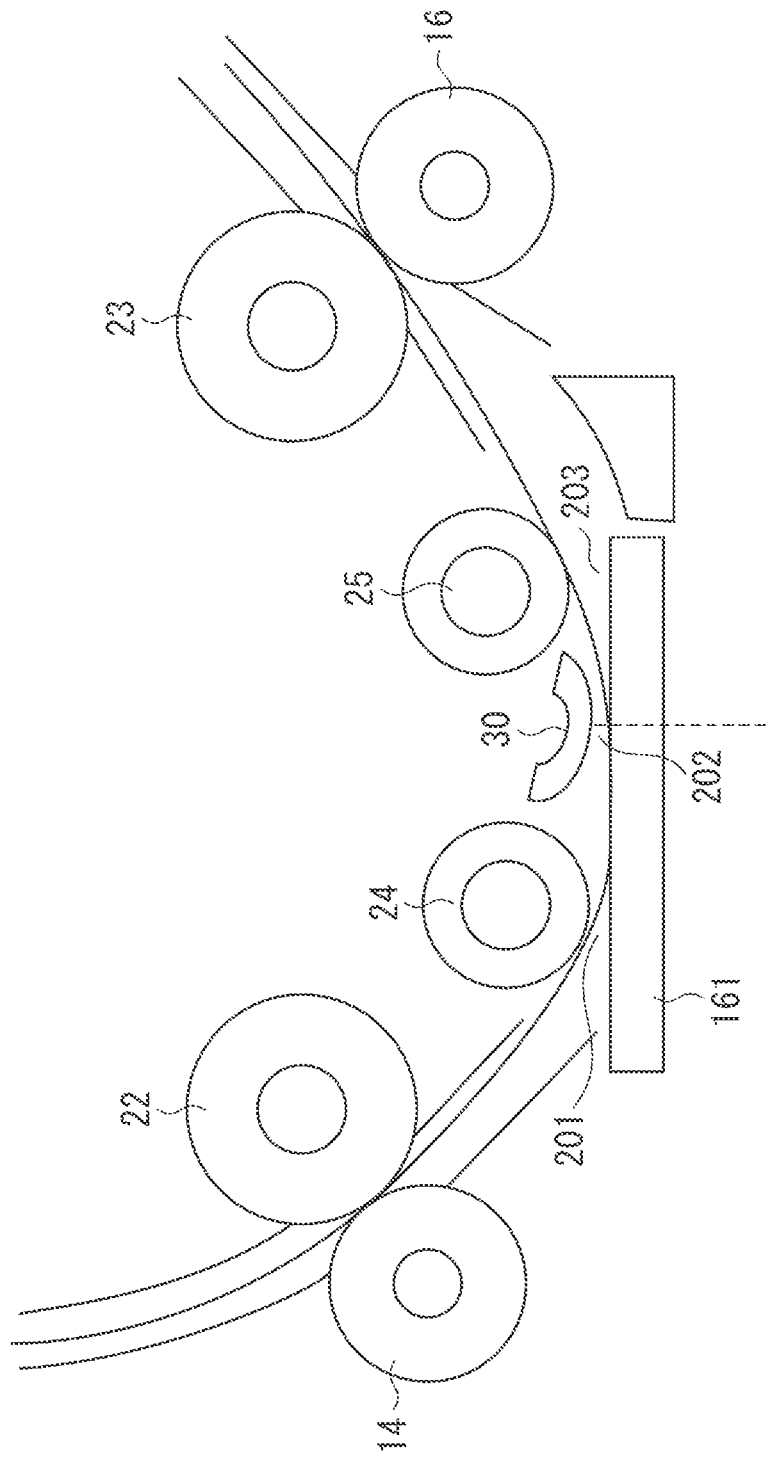
FIG. 8 is an explanatory view illustrating how a document is conveyed in the image reading apparatus in FIG. 6.
Figure 9:
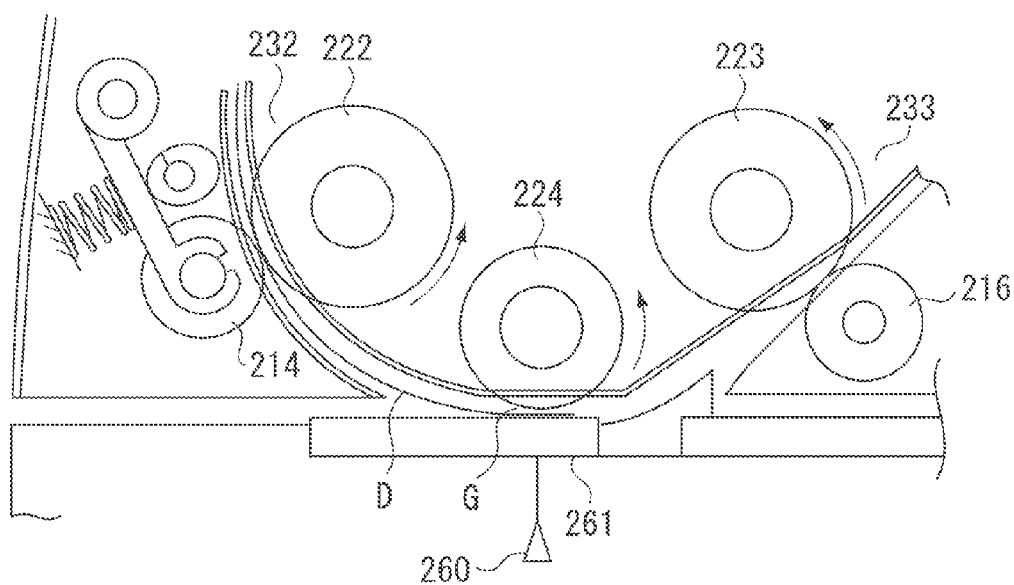
FIG. 9 is a schematic front sectional view of a conventional image reading apparatus.

As in the first exemplary embodiment, constant pressing force in the direction of the platen glass 161 is applied to the upstream platen roller 24 and the downstream platen roller 25 which can rock independently of each other (see FIG. 7). Thus, with respect to the tension generated in the document, the curved portion of the document in the vicinity of the platen glass 161 comes into contact with the upstream plate roller 24 and the downstream platen roller 25, so that the document is conveyed while maintaining a substantially fixed conveyance configuration. Normally, at the reading position 98, due to the stiffness of the document, the document is conveyed while pressed against the platen glass 161 (see FIG. 8).

Then, the leading edge of the document is nipped by the document discharge roller pair 18. As the conveyance force applied to the portion of the document on the downstream side of the reading position 98 increases, the predominance in the actual document conveyance speed is gradually shifted from the read roller pair 32 to the read discharge roller pair 33. Through the shift in the roller pair dominating the conveyance speed, the document tensile force is further increased.

In particular, in the case of a sheet with low stiffness, an influence of the change in tensile force is great, and the document is uplifted from the platen glass 161 at the reading position 98. With respect to the uplift of the document, the circular arc guide 30 is arranged in the vicinity of the reading position, so that a uplift amount of the document from the platen glass 161 can be regulated, and the image can be read while maintaining a constant document conveyance attitude from the leading edge to the trailing edge of the document.

In the ADF 2 described above, the vibration generated when the trailing edge of the document passes through the read roller pair 32 is less allowed to be transmitted to the reading position through the effect of causing the document to follow the conveyance speed of the upstream platen roller 24 in the vicinity of the platen glass 161. Further, since the upstream platen roller 24 and the downstream platen roller 25 do not pinch the document, no vibration is generated when the document passes through the rollers.

Further, the document conveyance attitude is maintained at the three points of the upstream platen roller 24, the circular arc guide 30, and the downstream platen roller 25, so that fluctuations in the actual document conveyance speed can be suppressed. Furthermore, by maintaining the document conveyance attitude at the three points of the upstream platen roller 24, the circular arc guide 30, and the downstream platen roller 25, an image defect due to uplift of the document from the platen glass 161 can be prevented.

Thus, the reader unit 150 can perform accurate image reading, and the read image is free from partial expansion or shrinkage. Further, focus blur, fogging, and the like of the image are prevented, and a high quality image can be read.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-032695 filed Feb. 17, 2010, which is hereby incorporated by reference herein in its entirety.

What is claimed is:

1. An image reading apparatus comprising:
  a reading unit configured to read an image of a conveyed document at a reading position;
  a platen arranged at the reading position and situated between the conveyed document and the reading unit;
  a first conveyance unit which is configured to convey the document to the reading position while pinching the document and from which a trailing edge of the document is released while the image on the document is being read;
  a second conveyance unit arranged on a downstream of the platen and configured to convey the document;
  an upstream rotary member arranged between the first conveyance unit and the second conveyance unit and configured to come into contact with the document at a position on an upstream of the reading position; and
  a downstream rotary member arranged between the first conveyance unit and the second conveyance unit and configured to come into contact with the document at a position on a downstream of the reading position, wherein a gap between the platen and the upstream rotary member is set smaller than a gap between the platen and the downstream rotary member.

2. The image reading apparatus according to claim 1, further comprising a platen guide provided at a position corresponding to the reading position of the platen and configured to guide the conveyed document,
wherein a gap between the platen and the platen guide is smaller than the gap between the platen and the upstream rotary member.

3. The image reading apparatus according to claim 2, wherein a cross section of the platen guide has a circular arc shape.

4. The image reading apparatus according to claim 2, wherein a proximity portion of the platen guide that is closest to the platen is arranged on the downstream of an intermediate position between the upstream rotary member and the downstream rotary member.

5. The image reading apparatus according to claim 2, wherein the reading position is set between the upstream rotary member and a proximity portion of platen guide that is closest to the platen.

6. The image reading apparatus according to claim 1, wherein the upstream rotary member and the downstream rotary member are capable of rocking independently of each other with respect to the platen.

7. The image reading apparatus according to claim 1, wherein the upstream rotary member and the downstream rotary member are rotated through transmission of drive force.

* * * * *